(12) United States Patent
Platel et al.

(10) Patent No.: US 6,845,711 B2
(45) Date of Patent: Jan. 25, 2005

(54) STACK SUPPORT TRANSFER SYSTEM AND A PRINTING MACHINE INCLUDING THE SYSTEM

(75) Inventors: Gérard Platel, Saint Maur (FR); Henri Peltier, Chatillon Sous Bagneux (FR); Maurice Billet, Chambourcy (FR); André Monnin, Rueil (FR); Thierry Couval, Pouxeux (FR); Christophe Nayrac, Torcy (FR)

(73) Assignee: Les Machines Dubuit, Noisy le Grand (FR)

( * ) Notice: Subject to any disclaimer, the term of this patent is extended or adjusted under 35 U.S.C. 154(b) by 0 days.

(21) Appl. No.: 10/178,250

(22) Filed: Jun. 25, 2002

(65) Prior Publication Data

US 2003/0019371 A1 Jan. 30, 2003

(30) Foreign Application Priority Data

Jun. 25, 2001 (FR) .......................................... 01 08364

(51) Int. Cl.[7] .............................................. B41F 17/00
(52) U.S. Cl. .......................... 101/44; 101/35; 414/908; 198/346.1; 29/33 P; 29/563
(58) Field of Search ............................. 101/35, 36, 37, 101/41, 42, 43, 44, 126; 414/908; 198/346.1; 29/33 P, 563

(56) References Cited

U.S. PATENT DOCUMENTS

| | | | | |
|---|---|---|---|---|
| 3,825,245 A | * | 7/1974 | Osburn et al. ................. | 269/30 |
| 4,450,950 A | * | 5/1984 | Foote, Jr. .................. | 198/474.1 |
| 4,673,076 A | * | 6/1987 | Mattson ................... | 198/346.2 |
| 4,746,005 A | * | 5/1988 | Bihary et al. ............. | 198/465.1 |
| 4,795,021 A | * | 1/1989 | Moller ..................... | 198/346.1 |
| 4,832,170 A | * | 5/1989 | Takeuchi et al. ......... | 198/346.1 |
| 4,915,569 A | * | 4/1990 | Cherko ...................... | 414/401 |
| 5,368,150 A | * | 11/1994 | Okada et al. ............. | 198/346.1 |
| 5,520,106 A | * | 5/1996 | Karlyn et al. .................. | 101/35 |
| 5,520,107 A | * | 5/1996 | Airoldi ........................ | 101/35 |
| 5,913,652 A | | 6/1999 | Zejda | |
| 6,213,011 B1 | * | 4/2001 | Dubuit ........................ | 101/35 |
| 6,234,742 B1 | | 5/2001 | Rodefeld et al. | |
| 6,494,309 B2 | * | 12/2002 | Pottier ..................... | 198/468.9 |
| 6,585,100 B2 | * | 7/2003 | Rodefeld ................. | 198/346.1 |

FOREIGN PATENT DOCUMENTS

| | | | |
|---|---|---|---|
| DE | 36 29 045 | | 3/1988 |
| DE | 198 08 690 | | 9/1999 |
| EP | 0 481 826 | | 4/1992 |
| EP | 0 737 968 | | 10/1996 |
| JP | 408025166 A | * | 1/1996 |

\* cited by examiner

Primary Examiner—Daniel J. Colilla
Assistant Examiner—Jill E. Culler
(74) Attorney, Agent, or Firm—Young & Thompson

(57) ABSTRACT

A system for transferring supports for objects which can be stacked and unstacked between a conveyor and a machine for printing the objects, characterized in that it includes:

a mobile transfer table which has two locations each adapted to receive an object support and which is adapted to occupy a plurality of positions, first drive elements adapted to drive the transfer table vertically up and down, and second drive elements adapted to advance or withdraw the transfer table horizontally and simultaneously to transfer a support containing objects and an empty support or to withdraw the empty transfer table to a position awaiting a new support.

15 Claims, 11 Drawing Sheets

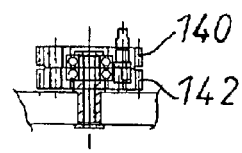
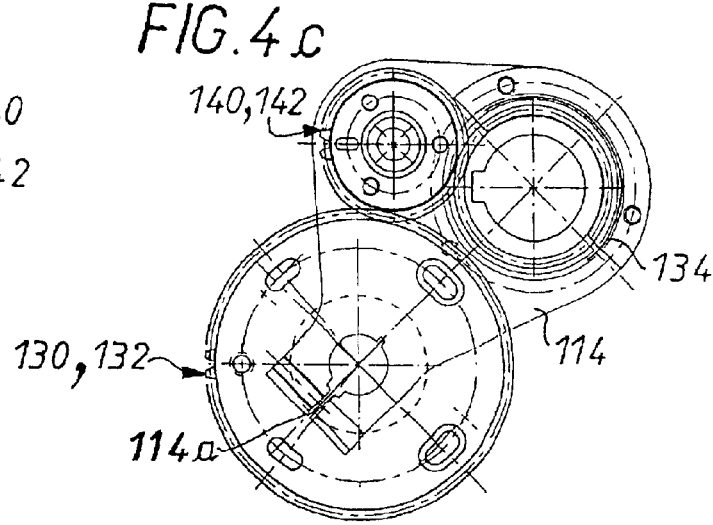
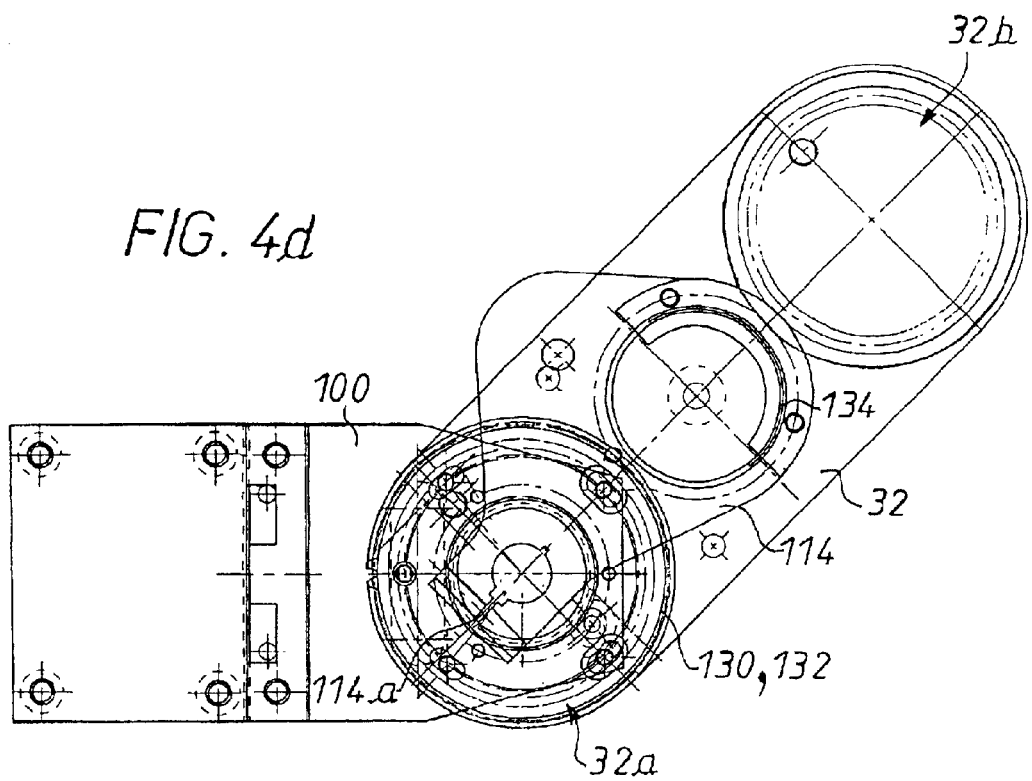

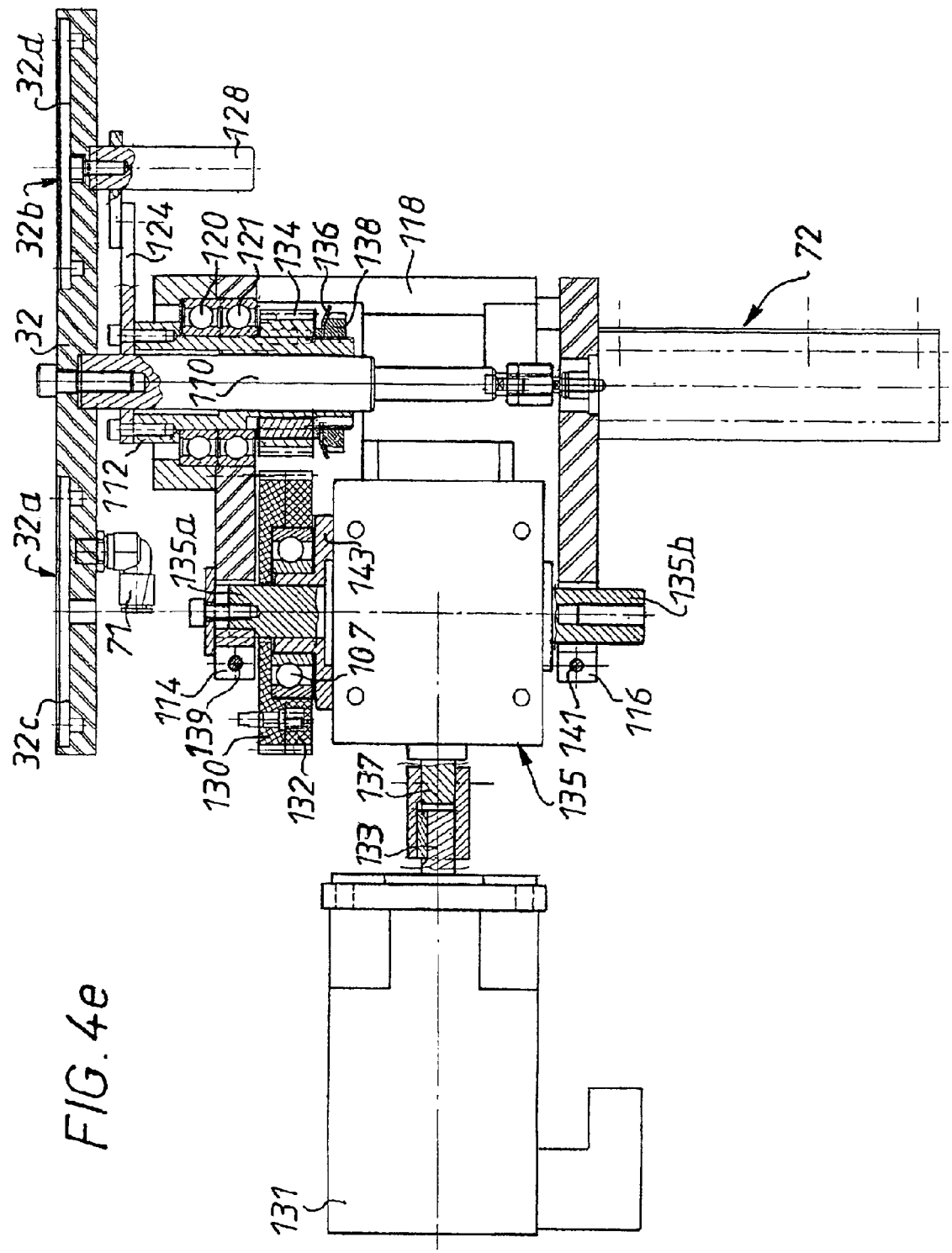

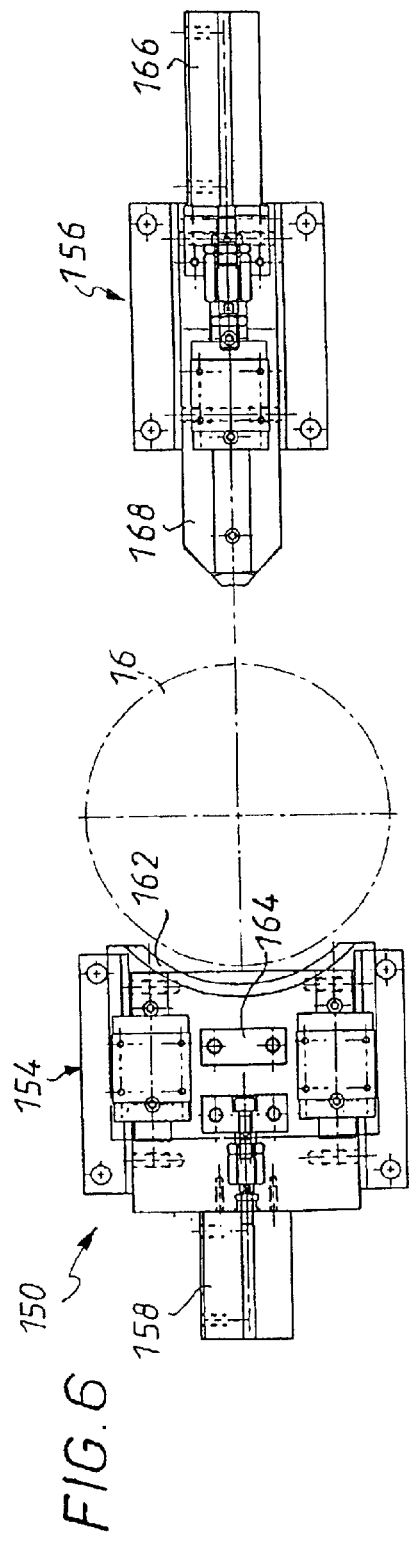
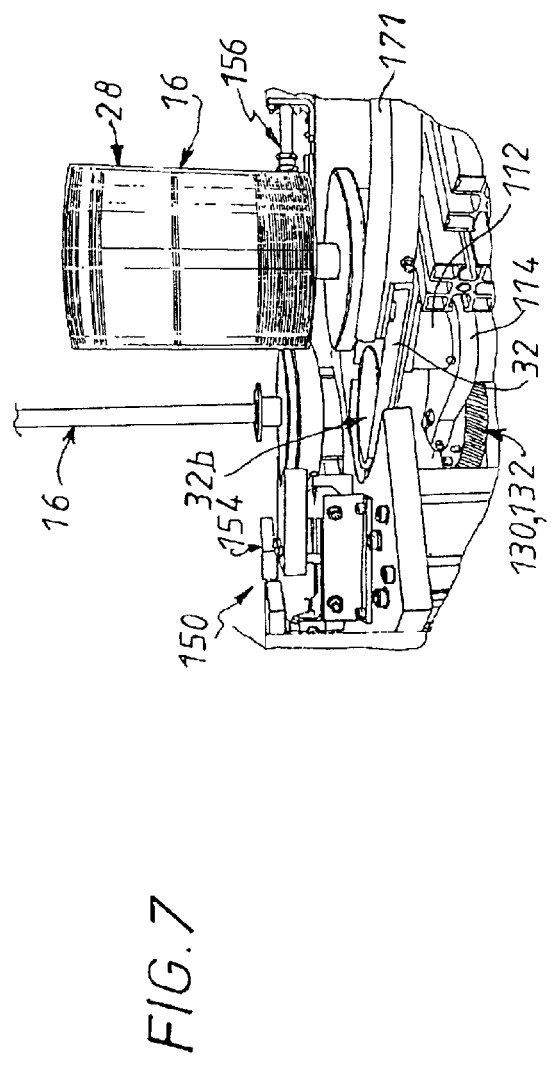
FIG. 6
FIG. 7

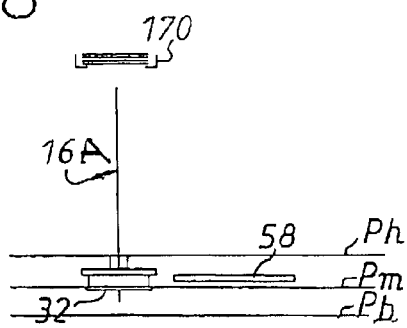
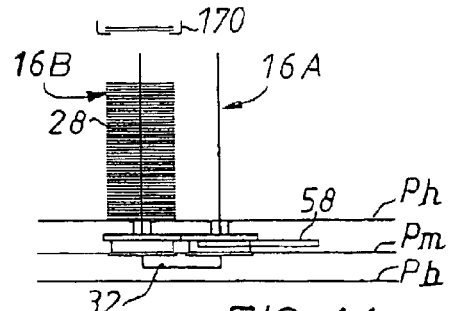
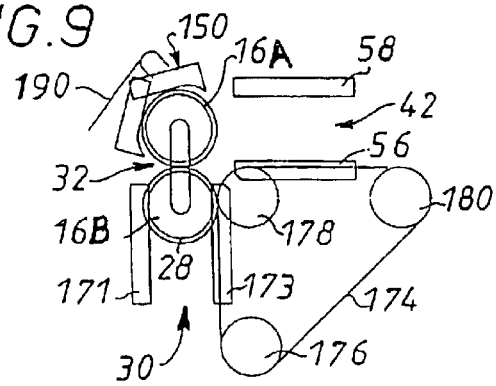
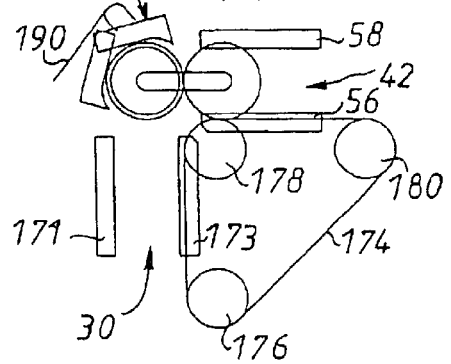
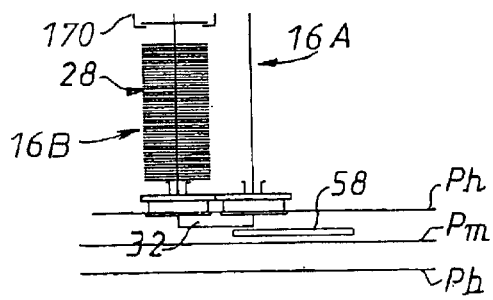
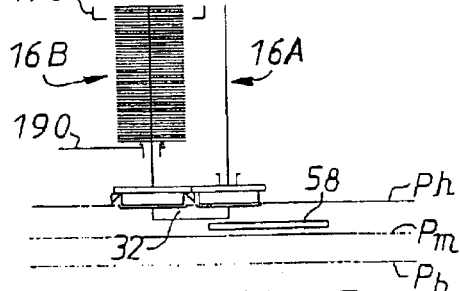
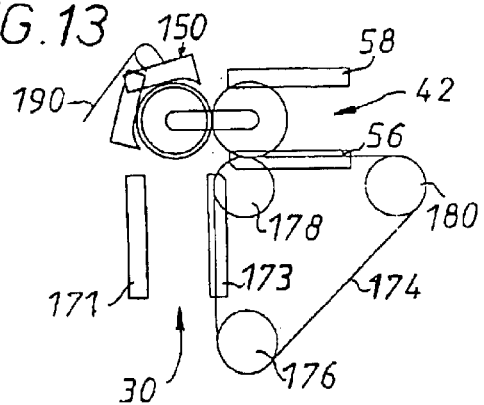
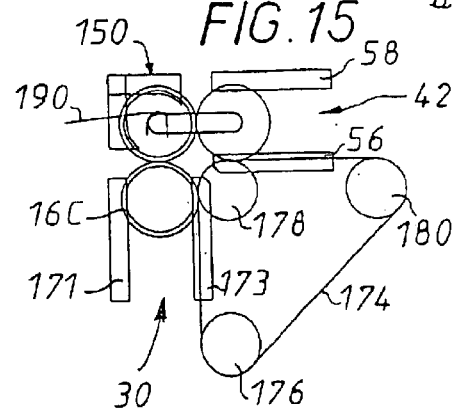

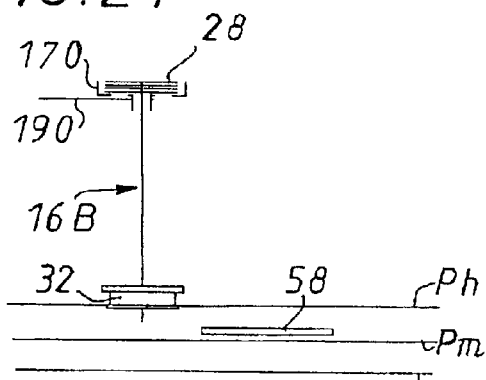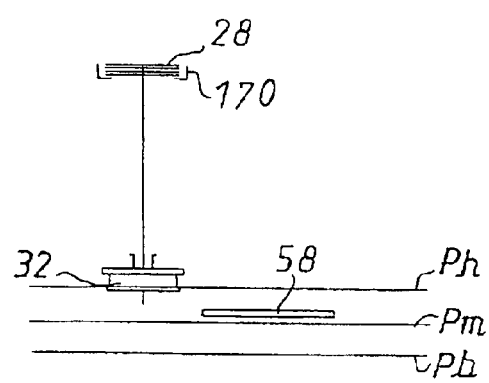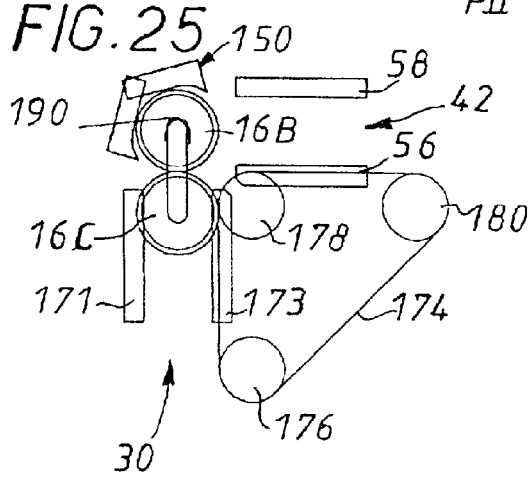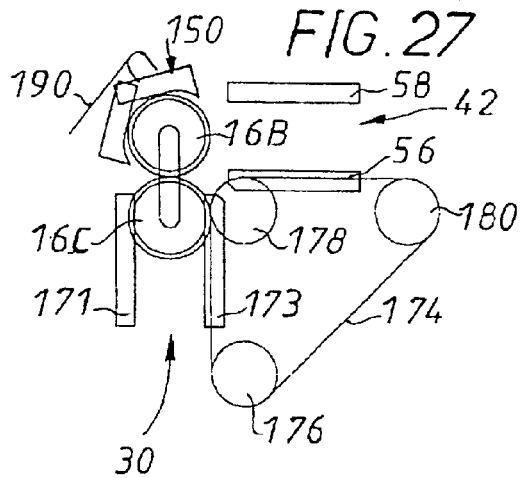

STACK SUPPORT TRANSFER SYSTEM AND A PRINTING MACHINE INCLUDING THE SYSTEM

BACKGROUND OF THE INVENTION

The present invention concerns a system for transferring supports for objects which can be stacked and unstacked and a printing machine including the system.

The present invention concerns offloading objects that are to be printed by a printing machine from stack supports for stacked objects and loading the supports with printed objects, for example.

As a general rule, the stack supports pass first through a loading station which transfers a stack support from a conveyor (a conveyor belt or the like) to an offloading unit at which the objects are unstacked and placed on the printing machine. The offloading unit includes a robot provided with holding means adapted to pick up a stacked object and put it down at a station of the printing machine, for example.

Similarly, a loading unit consisting of the robot referred to above, for example, takes up the printed objects one by one from a printing station of the machine and stacks them on an empty support which, when loaded, is evacuated by another conveyor.

SUMMARY OF THE INVENTION

An object of the present invention is to provide the simplest possible transfer system between a system for feeding supports carrying stacked objects to be printed and a machine and/or between the machine and a system for evacuating supports carrying stacked and printed objects.

Thus the present invention consists of a system for transferring supports for objects which can be stacked or unstacked between a conveyor and a machine for printing said objects, characterized in that it includes:

a mobile transfer table which has two locations each adapted to receive an object support and which is adapted to occupy a plurality of positions, first drive means adapted to drive the transfer table vertically up or down, and second drive means adapted to advance or withdraw the transfer table horizontally and simultaneously to transfer a support containing objects and an empty support or to withdraw the empty transfer table to a position awaiting a new support.

Thus the transfer system according to the invention processes two object supports simultaneously, one containing objects and the other empty.

The system is furthermore of simple design.

According to one feature, the system includes retaining means for retaining an object support while stacking or unstacking objects in a position above the transfer table and the second drive means are activated to withdraw the transfer table to the waiting position.

Accordingly, the system according to the invention advantageously evacuates an empty object support while an at least partly loaded object support is being stacked or unstacked and moves the empty transfer table to a position awaiting a new support during this stacking or unstacking operation.

According to one feature, the retaining means are in two parts and comprise first positioning means adapted to define an extreme position of the support and which include an imprint adapted to receive the support in that extreme position and second positioning means adapted to adjust the position of the support against said imprint.

According to another feature, the second drive means are adapted to drive hypocycloidal movement of the transfer table.

According to one feature, the second drive means include a motor means with a horizontal shaft connected to a crank mechanism coupled to a pivot adapted to be rotated about a vertical axis by the motor means and first and second gear means provided on the pivot and on a support member of the transfer table, respectively, cooperate with each other so that the transfer table rotates about the pivot.

According to one feature, the system includes intermediate gear means through which the first and second gear means cooperate with each other.

According to one feature, the crank mechanism has a first part mounted on the shaft of the motor means and which includes a lever inclined to said shaft and extending from said first part and a second part in the form of a crank pin mounted at one end on the free end of the lever to rotate freely thereon and perpendicularly thereto and said second part has an opposite end adapted to pivot on a horizontal pin perpendicular to the shaft of the motor means and which is held between two vertical walls of the pivot.

According to one feature of the invention the second drive means include a motor means that includes a motor with an output shaft connected to a reduction gear with an output shaft which is perpendicular to the output shaft of the motor, the motor being controlled so that its output shaft reciprocates, thereby reciprocating the output shaft of the reduction gear.

This kind of arrangement of the motor means and appropriate control of the motor eliminate the need for a crank mechanism.

According to another feature of the invention first gear means and second gear means on the output shaft of the reduction gear and on a support of the transfer table, respectively, cooperate with each other so that the transfer table rotates about the output shaft of the reduction gear.

According to a further feature of the invention the first and second gear means cooperate with each other through the intermediary of intermediate gear means.

According to one feature, the first drive means operate on the support member of the transfer table.

According to one feature, the first drive means include a piston-and-cylinder actuator.

According to one feature, the system includes means for centring the supports at each location of the transfer table.

According to one feature, the centring means take the form of a recess formed in the thickness of the transfer table at each location thereof.

Another aspect of the invention provides a printing machine including a circular contour printing table which has a plurality of object stations regularly distributed at its periphery and each adapted to receive an object to be printed, a station for offloading objects to be printed from a support, and a station for loading printed objects onto an empty support, characterized in that at least one loading and/or offloading station includes a transfer system as briefly described above.

According to one feature, the printing machine includes two transfer systems as set out briefly above, a conveyor is provided for feeding supports containing objects to be printed to a first transfer system of an offloading station, means are provided for conveying empty supports offloaded from the transfer system of the offloading station to the second transfer system of the loading station to be loaded with printed objects, and a second conveyor is provided for evacuating the supports containing printed objects from the second transfer system.

BRIEF DESCRIPTION OF THE DRAWINGS

The following description with reference to the accompanying diagrammatic drawings explains further the objects and advantages of the invention. It is clear that the description is given by way of example only and has no limiting character.

In the appended drawings:

FIG. 4b is a sectioned view of intermediate gear means, FIG. 4c is a plan view of the layout of the first and second gear means and the intermediate gear means from FIG. 4b, FIG. 4d is a plan view showing the superposed two locations of the transfer table, the top plate, the first gear means and (in part) the second gear means, FIG. 4e shows another embodiment of the drive mechanism of the transfer table shown in FIG. 4a, FIG. 5 is a view of the means for retaining an object support as seen in the direction of the arrow V in FIG. 2, FIG. 6 is a plan view of the retaining means, FIG. 7 is a perspective view of a transfer system and two supports carrying objects to be transferred, as seen in the direction of the arrow V in FIG. 2, FIGS. 8, 10, 12, 14, 16, 18, 20, 22, 24, 26 are diagrammatic side views illustrating the offloading of stacked objects on object supports, and FIGS. 9, 11, 13, 15, 17, 19, 21, 23, 25, 27 are diagrammatic plan views respectively corresponding to the views of FIGS. 8, 10, 12, 14, 16, 18, 20, 22, 24, 26.

DESCRIPTION OF THE PREFERRED EMBODIMENT

The present invention is described hereinafter with reference to a printing machine shown in plan view in FIG. 1.

Figure 1:
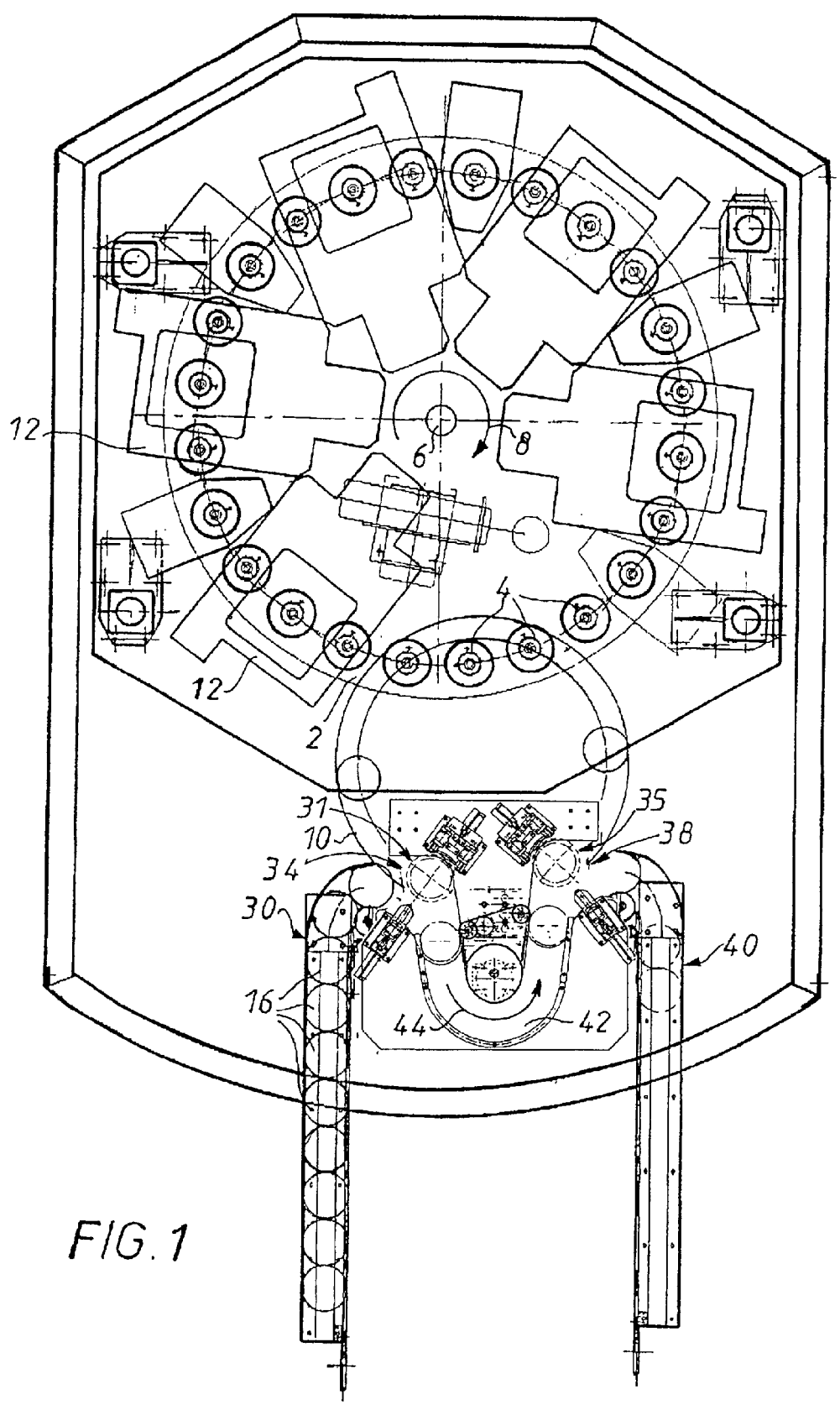
FIG. 1 is a plan view of a printing machine including two object support transfer systems.

The printing machine shown in plan view in FIG. 1 includes a circular contour printing table 2 which has a plurality of object stations 4 regularly distributed at its periphery and each of which is adapted to receive an object to be printed (not shown), is rotatable stepwise about an axis 6 passing through its centre and perpendicular to its plane, in practice a vertical axis, and moves the object stations 4 successively, for example in the clockwise direction indicated by the arrow 8 in FIG. 1, to a unit 10 for loading objects to be printed, to a plurality of workstations 12 each including printing means, and to the unit 10, which then acts as a printed object offloading unit.

The objects to be printed can be of any kind that can be stacked. In the embodiment shown they are flat objects, to be more precise compact discs with a central hole.

Figure 5:
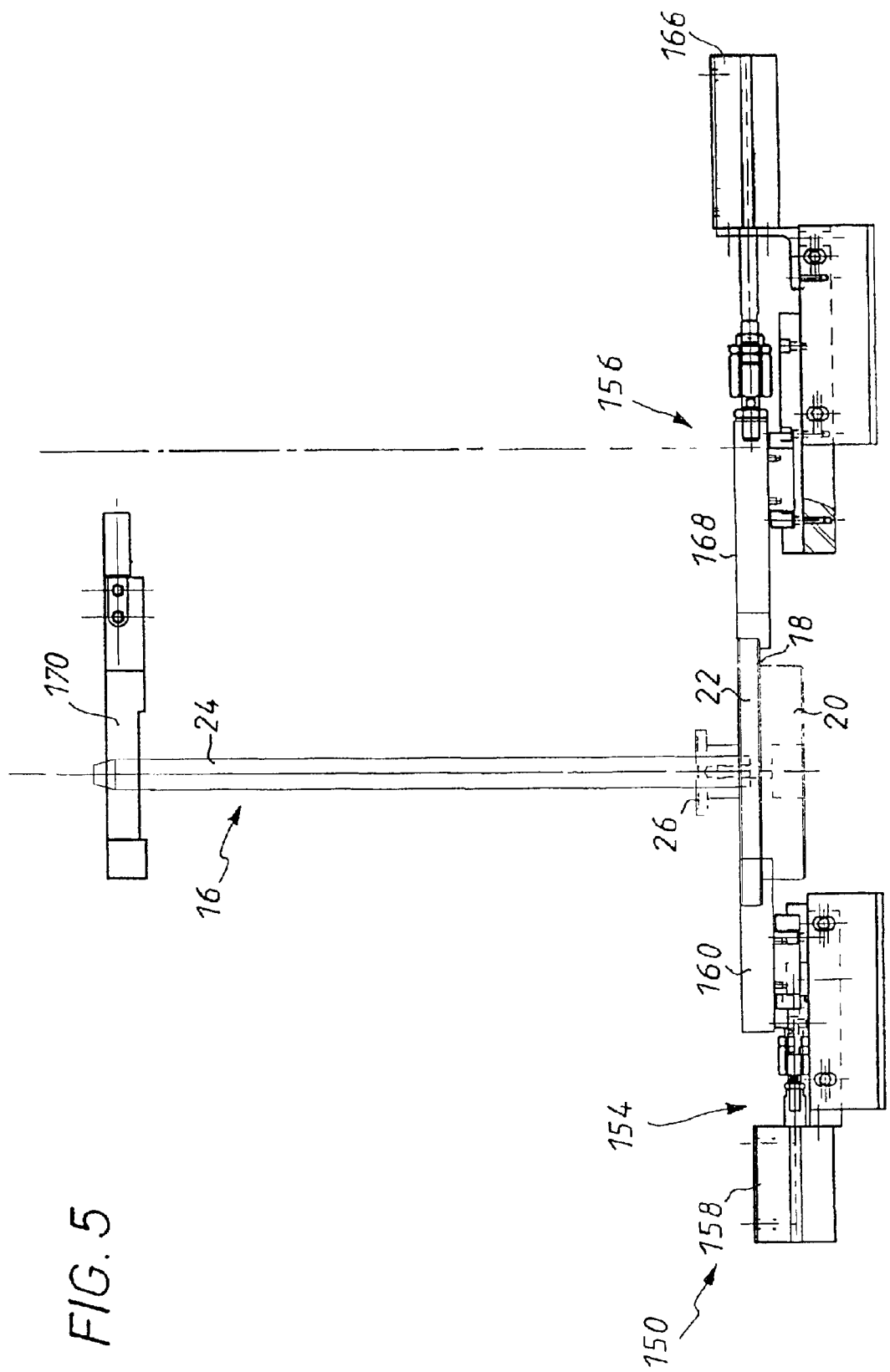
Figure 16:
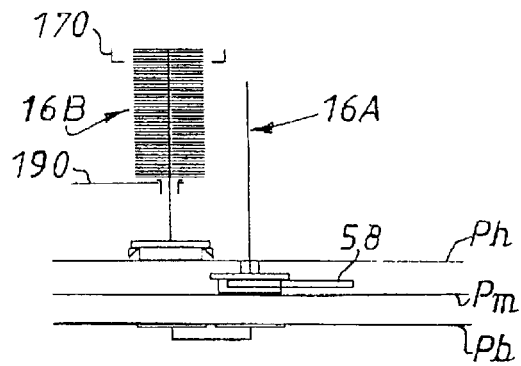

The objects are stacked on stack supports 16. As shown in FIG. 5, for example, a stack support 16 has a base 18 with a circular cylindrical foot 20 on top of which is a plate 22, and a column 24 fastened to the base 18, projecting axially therefrom and pointed at the top for fitting the central hole in the objects to be printed over it. A ring 26 slides on the column 24.

The cylindrical foot 20 of the stack support 16 and the plate 22 are circular and the diameter of the foot is less than the diameter of the plate. The ring 26 has a cylindrical body on top of which is a flange.

This kind of stack support 16 is already in widespread use and well known to the person skilled in the art. In service, it carries a stack 28 of objects to be printed resting on the ring 26.

Because the printing machine does not in itself constitute the subject matter of the present invention, it is not described in detail here. The machine described in the document FR 2 714 867 corresponds substantially to the machine represented in FIG. 1 and reference is therefore made to that document for its description.

As can be seen in FIG. 1, a first conveyor system or conveyor 30 feeds the machine with stack supports 16 containing objects to be printed. The stack supports 16 arriving on the conveyor 30 are placed on a first transfer system 31 associated with a station 34 for offloading objects to be printed. The objects stacked on the stack support 16 are then unstacked from the stack support by a stacker/unstacker robot which constitutes the loading unit 10, and are placed on the object stations 4 of the printing table 2. When the objects have been printed, they are taken up again from an object station 4 of the printing table by the stacker/unstacker robot, which now constitutes the offloading unit 10, and are placed on a stack support 16 on an associated second transfer system 35 at a station 38 for loading printed objects.

When the stack support 16 has been placed on the transfer system 35 and filled with printed objects, it is then placed on a second conveyor 40 which transfers it to another machine.

Transfer systems 31 and 35 transfer the stack supports 16 from one conveyor to another whilst objects to be printed are offloaded from one of them (the system 31) and printed objects are loaded onto the other one (the system 35).

One transfer system is associated with the offloading station 34 and the other transfer system is associated with the loading station 38.

This type of transfer system can be used with other machines.

Figure 2A:
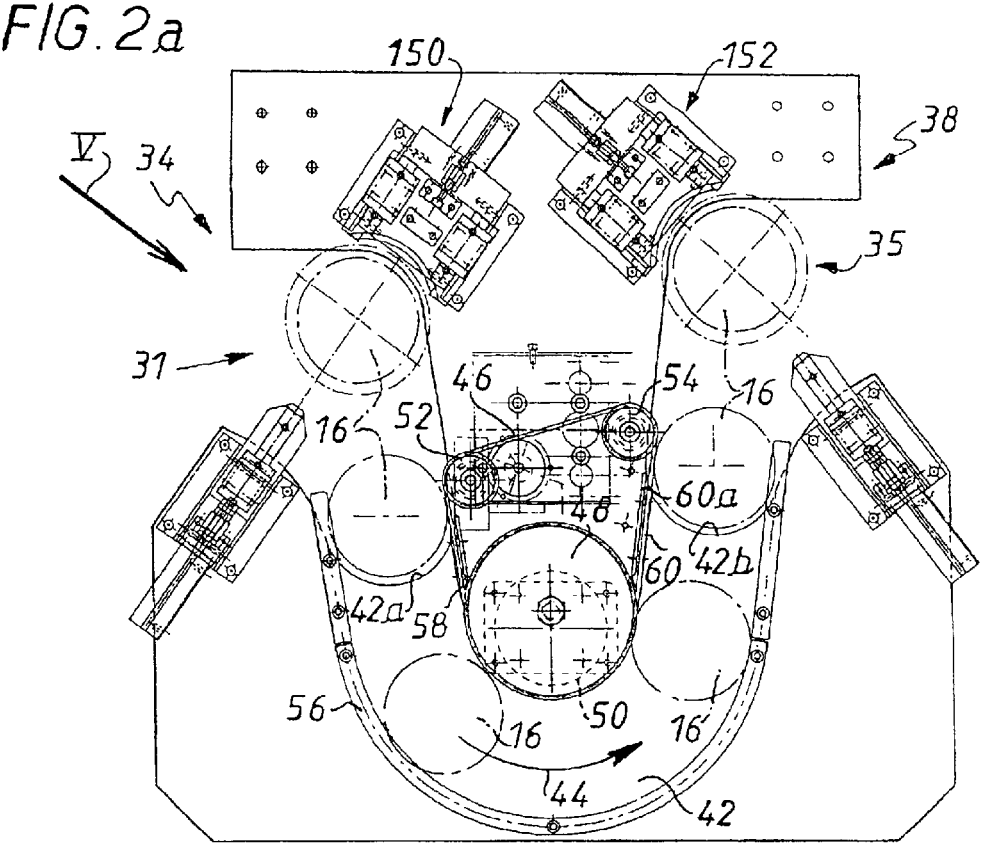
FIG. 2a is a diagrammatic view to a larger scale of stations 34 and 38 from FIG. 1 without the transfer tables.

As shown in FIGS. 1 and 2a, when objects to be printed have been offloaded from the stack supports 16 at the offloading station 34 they are evacuated from that station by a conveyor system 42 (called the intermediate conveyor) in the direction of the loading station 38, which is indicated by the arrow 44.

A belt 46, for example a round belt, mounted on a drive pulley 48 connected to a drive motor 50 indicated in dashed line in FIG. 2a and two idler pulleys 52 and 54 drives the empty support 16 on the intermediate conveyor 42, as indicated by the arrow 44.

The positions of an empty support 16 that has just been evacuated from the first transfer system 31 associated with the offloading station 34 and transferred to the second transfer system 35 from the loading station 38 are shown in dashed line at the entry 42a and at the exit 42b, respectively, of the conveyor 42.

It must be noted that in these two extreme positions the empty support 16 rests partly on an exterior guide rail 56 and on portions of interior guide rails 58 and 60.

When the empty support 16 reaches the exit 42b of the intermediate conveyor 42, it abuts against the end 60a of the interior guide rail, which forms a buffer.

Figure 2B:
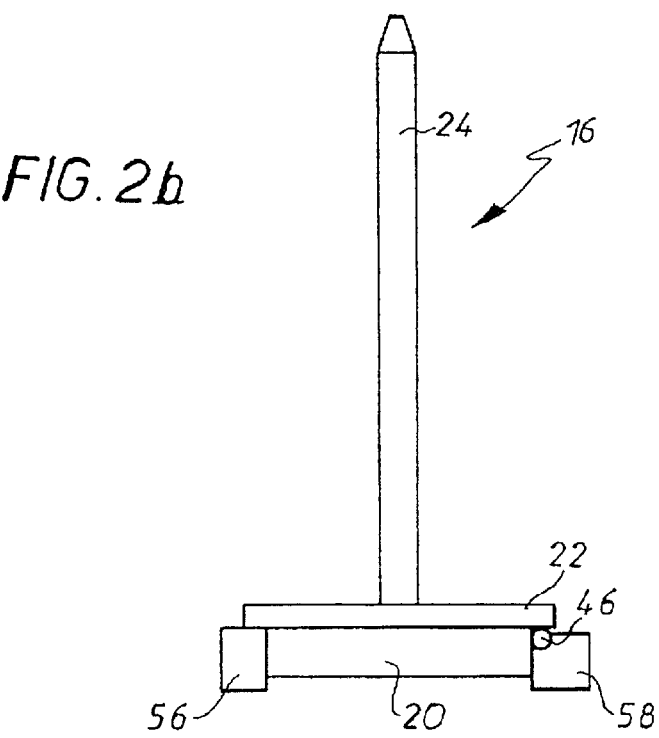
FIG. 2b is a diagrammatic view showing an object support carried by the intermediate conveyor 42 in cross section relative to the direction of said conveyor.

Referring to FIG. 2b, the means for driving an object support 16 from the intermediate conveyor will now be reconsidered in more detail.

Note that everything explained below in connection with a machine for printing objects applies equally to the feed conveyor 30 and the evacuation conveyor 40 in FIG. 1 and to any other conveyor for object supports of the type shown in FIGS. 2b and 5.

In the FIG. 2b configuration, the base plate 21 of the support 16 rests on the exterior rail 56 serving as a fixed guide for the support and on the belt 46 mounted on the interior rail 58.

Accordingly, the weight of the support is divided between the guide 56 and the drive member consisting of the belt 46.

The foot 20 of the base 22 is arranged between the drive belt 46, on one side, and the fixed guide 56, on the other side, which together delimit the conveyor path.

The round belt 46, or any other drive member (other types of belt, strip, etc.), moving along the conveyor path and in contact with the periphery of the base of the support drives rotation of the support and, at the same time, rolls on the opposite guide 56.

Rolling on the opposite guide 56, the driven support is subject to friction.

Accordingly, dividing the weight of the support between the guide 56 and the belt 46 does not increase excessively the forces to be provided to drive the belt.

This would not be the case were the whole of the weight of the support to rest on the belt 46.

It will be noted that although the movement of the object support 16 is in a plane in this example (that of the three conveyors 30, 40 and 42), it can have a three-dimensional trajectory.

The configuration shown in FIG. 2b advantageously leaves free the lower part of the support at the level of the foot 20, unlike prior art mechanisms such as systems of the type including a conveyor belt on which the foot of the support rests.

Accordingly, as described later, when the support 16 loaded with objects to be stacked arrives at the end of the feed conveyor 30 situated at the offloading station 34, the transfer table 32 of the transfer system 31 can pick up the support from below, i.e. by picking up its foot 20.

In the context of the support transfer systems 32, 36, an irregular flow of object supports 16 can be caused by different transfer system operating frequencies.

This is because the number of objects on the supports at the entry of the machine can then be different from the number of objects on the supports at the exit.

In this type of application, the intermediate conveyor 42 described above can regulate the flow of supports and alleviate the lack or surplus of supports caused by the irregular flow.

Depending on the different operating frequencies of the transfer systems, the designed number of object supports that can be accumulated on the intermediate conveyor defines the autonomous capacity of the printing machine (its capacity for operation without operator intervention).

The intermediate conveyor 42 therefore constitutes a system for dynamically managing the recycling of empty object supports for reuse by filling the same object supports.

Figure 3:
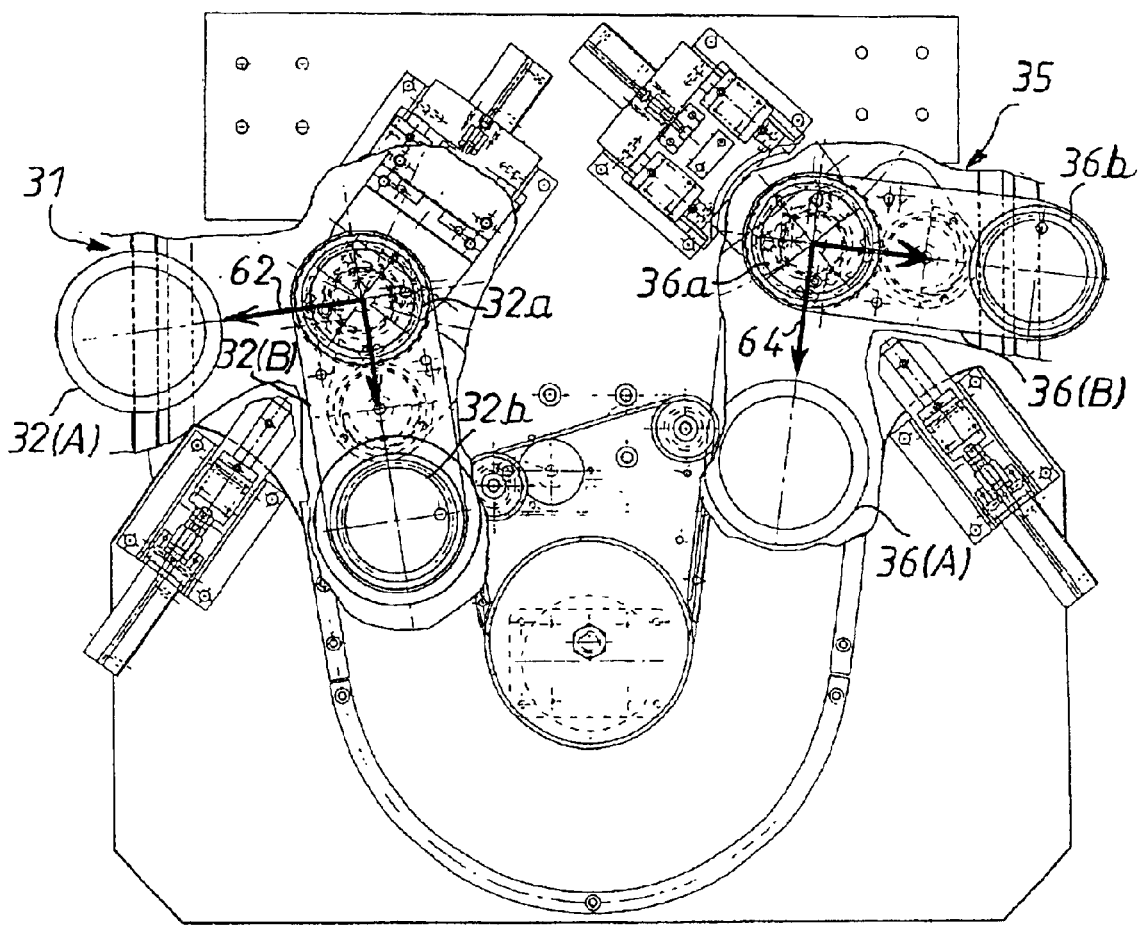
FIG. 3 is a plan view of the transfer tables of the transfer systems according to the invention in two different positions.

FIG. 3 shows in two different positions the respective mobile transfer tables 32 and 36 of the transfer systems 31 and 35 respectively associated with the offloading station 34 and the loading station 38 of FIG. 2.

The table 32 is placed at the entry 42a of the conveyor 42 so that it can evacuate to the conveyor the empty support 16 shown in dashed line in FIG. 2.

Its position is the position 32(B) in FIG. 3, in which the other extreme position 32(A) of the transfer table is shown by two concentric circles.

The transfer table 36 occupies one extreme position 36(B) shown in FIG. 3 and another extreme position 36(A) represented by concentric circles.

The position 36(A) of the transfer table 36 is that enabling it to pick up the empty support 16 shown at the exit 42b of the intermediate conveyor 42 from FIG. 2.

Each transfer table 32, 36 has two locations, respectively 32a, 32b and 36a, 36b.

Figure 4A:
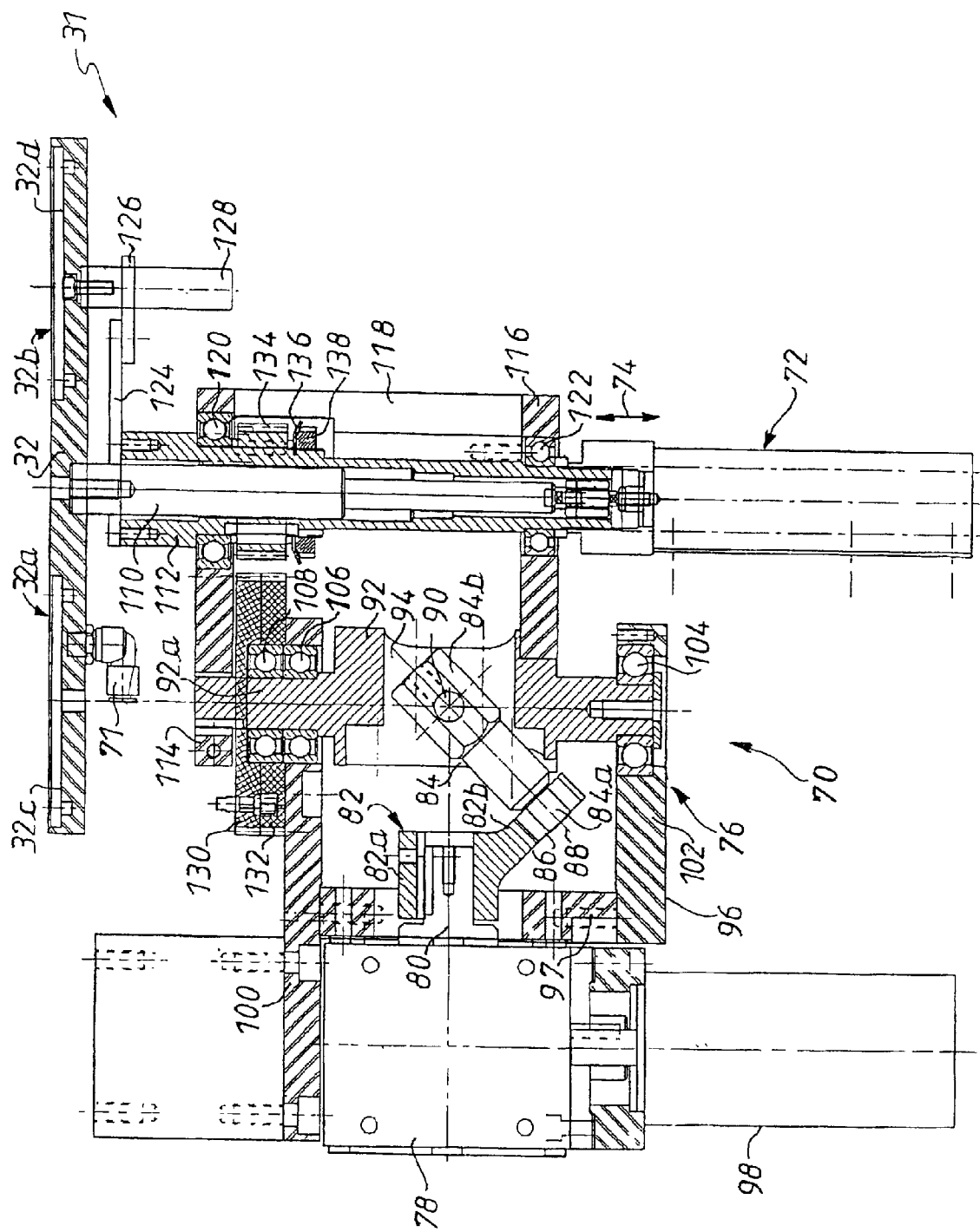
FIG. 4a is a view of a transfer table and its drive mechanism in section as seen in the direction of the arrow III in FIG. 2.

Those locations can be seen in FIG. 4a in the case of the transfer table 32.

Each of the two locations on a transfer table is adapted to receive a stack support 16 that is either empty or filled with objects to be printed.

It will be noted that FIG. 3 shows how each transfer table can move horizontally in the directions indicated by the double-headed arrows 62 and 64.

However, each transfer table can also move vertically up and down, as described later with reference to FIG. 4a and in particular with reference to FIG. 8 and the subsequent figures.

FIG. 4a shows a drive mechanism 70 of the transfer table 32.

As shown in this figure, the transfer table 32 is provided with means for centering the supports 16 at each of its locations 32a and 32b.

These centering means take the form of a respective recess 32c, 32d in the thickness of the upper part of the transfer table.

Accordingly, when an object support is positioned at each location of the transfer table 32 (or 36), it is accommodated in the corresponding recess and is therefore retained in this carefully calculated position.

It will be noted that a suction system, only a portion 71 of which is shown in FIG. 4a, is provided under each location of the transfer table in order to hold the object supports in position when the table moves.

The mechanism 70 for driving the transfer tables 32 and 36 in accordance with the invention includes first drive means 72 which are adapted to drive the transfer table vertically up and down, as shown by the double-headed arrow 74 in FIG. 4a, respectively to transfer an object support onto said transfer table or to evacuate it therefrom.

The transfer system also includes second drive means 76 adapted to drive horizontal advance or withdrawal of the transfer table 32, respectively to transfer simultaneously a support containing objects and an empty support or to return the empty transfer table to its position 32(A) (FIG. 3) awaiting a new support.

The mechanism 70 includes a drive motor 98 fitted with a reduction gear 78 and an output shaft 80 that is disposed horizontally with a crank mechanism mounted on it.

The crank mechanism has a first part 82 mounted on the shaft 80 of the motor via a body 82a and which includes a lever 82b inclined to the shaft of the motor.

The angle of inclination is substantially equal to 45°, for example.

The crank mechanism has a second part 84 in the form of a crank pin which is freely rotatable about two axes perpendicular to each other and the shaft 80.

One end 84a of the crank pin 84 is inserted into a hole 86 in the free end of the lever 82b.

The crank pin 84 can rotate freely about its longitudinal axis 88.

The opposite end 84b of the crank pin 84 pivots on a horizontal pin 90 perpendicular to and in the same plane as the shaft 80.

The pin 90 is mounted on a pivot 92 and is perpendicular to two walls of the pivot which are disposed face-to-face and between which the crank pin 84 is retained.

Only one wall 94 is shown in FIG. 4a.

The vertical pivot 92 is perpendicular to the shaft 80 of the motor and is mounted on a frame 96 fixed to a frame supporting the motor 98 and its reduction gear 78, more particularly it is mounted between the two arms 100 and 102 of the generally U-shaped frame.

It will be noted that ball bearings 104 and 106, 108 are provided on the respective walls 102 and 100 of the frame to enable the pivot 92 to be rotated about a vertical axis by the crank mechanism driven by the motor means 98, 78.

It will be noted that the walls 100 and 102 of the frame 96 are strictly parallel to each other and strictly perpendicular to the base 97 of the frame, which is itself perpendicular to the rotation axis 80 of the motor, so that the pivot 92 is strictly perpendicular to the rotation axis of the motor.

Moreover, the transfer table 32 is mounted on a support member 110 inside a vertical sheath 112 that passes through two plates 114 and 116 perpendicular to said sheath.

The upper plate 114 and the lower plate 116 are linked by a semicylindrical wall portion 118 parallel to the sheath 112.

Ball bearings 120 and 122 are located in respective orifices in the top plate 114 and the bottom plate 116.

Two connecting arms 124 and 126 are coupled together and respectively coupled to the support member 110 and to a pin 128 that extends from the lower face of the transfer table 32 in the downward direction, as far as the side corresponding to the upper plate 114.

This limits rotation of the transfer table 32 about the pivot 92, when the pin 128 abuts against the upper plate 114 (see below).

It must be noted that mechanisms other than a crank mechanism can be used to reciprocate the pivot about which the transfer table turns through 90°.

It will be noted that the upper plate 114 and the lower plate 116 are perpendicular to the vertical direction of the pivot 92.

It will also be noted in FIGS. 4c and 4d that the upper plate 114 has a slot 114a at one end, enabling it to be mounted on the pivot 92.

A similar arrangement, not shown in the figures, is provided on the lower plate 116.

First gear means in two parts 130, 132 are mounted on the upper face of the wall 100 of the frame 96, centred relative to an extension 92a of the pivot 92.

The first gear means 130, 132 are disposed between this wall 100 and the upper plate 114 and take the form of toothed pinions.

Second gear means 134 are provided around the sheath 112 and are secured by a washer 136 and a nut 138.

The second gear means also take the form of a toothed pinion.

Intermediate gear means shown in FIGS. 4b and 4c act directly on the first and second gear means previously mentioned to reverse the rotation of the pinion 134 which, if it were in direct contact with the pinions 130, 132, would rotate in the opposite direction to them.

The intermediate gear means are also toothed pinions in two parts 140 and 142.

FIG. 4c shows the arrangement of the various gear means relative to the upper plate 114 and relative to each other.

The two-part assembly of the pinions 130 and 132, on the one hand, and of the pinions 140 and 142, on the other hand, takes up play.

Accordingly, the pinions 140 and 142 take up play between the pinions 130, 132 and 140, 142, on the one hand, and between the pinion 134 and the pinions 140 and 142, on the other hand.

The drive means 76 just described with reference to FIG. 4a constitute second drive means for driving hypocycloidal movement of the transfer table.

This means that the pivot 92 is initially driven in rotation about a vertical axis by the crank mechanism connected to the motor means 98, 78 and that the support member 110 of the transfer table 32 is subsequently driven in rotation about the pivot 92 by the gear means previously referred to that cooperate with each other as described above.

This embodiment constitutes the embodiment enabling the transfer table 32 to perform the shortest possible movement in the minimum time.

However, it must be noted that, in a different embodiment with less crucial overall size and timing constraints, the transfer table 32 could move in rectilinear translation or rotation.

The first drive means 72 of the transfer table 32 comprise a piston-and-cylinder actuator whose piston rod slides inside the sheath 112 in order to move the support member 110 of the transfer table vertically up or down, depending on the required position.

As shown in FIGS. 1 and 2a, each transfer system includes means 150, 152 for retaining object supports on which objects are being unstacked or stacked, respectively at the offloading station 34 and at the loading station 38 from FIGS. 1 and 2a.

FIG. 4e is a view analogous to that of FIG. 4a and shows a different embodiment of the drive mechanism of the transfer table of the transfer system according to the invention.

In this embodiment, elements unchanged relative to the previous embodiment retain the same reference numbers and are not described again.

As shown in FIG. 4e, a motor means is provided in a different arrangement to that of FIG. 4a in order no longer to use a crank mechanism driven in rotation via a reduction gear, which simplifies the system according to the invention.

Apart from the description relating to the crank mechanism, everything described with reference to the preceding figures remains valid in this embodiment, unless otherwise specified.

The resulting transfer system includes fewer components than that from FIG. 4a, which simplifies its manufacture, reduces manufacturing costs and also simplifies subsequent maintenance operations.

Moreover, the system is also more reliable in that the motion transmission system is shorter and there are fewer moving parts.

The motor means includes a motor 131 with a horizontal output shaft 133.

The motor is a stepper motor, for example, and is electrically controlled so that the shaft 133 reciprocates through 90°.

This motion is transmitted to a reduction gear 135 without backlash via a horizontal input shaft 137 adapted to be coupled to the output shaft 133 of the motor.

The reduction gear without backlash from FIG. 4e replaces the moving components 82, 84 and 92 of FIG. 4a and is attached to the frame.

The reduction gear 135 has two vertical output shafts 135a and 135b which respectively cooperate with two plates 114 and 116 interconnected by a semicylindrical wall portion 118.

To be more specific, the output shafts 135a, 135b are attached to the plates by keys and each plate-output shaft-key assembly is clamped up by fixing means 139, 141.

The bearing 104 from FIG. 4a is not included in this embodiment.

In contradistinction to FIG. 4a, the walls 100 and 102 are no longer present and the first gear means 130, 132 are mounted on a support 143 around the upper output shaft 135a of the reduction gear.

To this end, to make FIG. 4d correspond to this other embodiment, the part 100 must be replaced by the part 143.

It will be noted that the bearings 106 and 108 of FIG. 4a are replaced by a bearing 107 between the part 143 and the shaft 135a.

Also, the bearing 122 from FIG. 4a is replaced by a bearing 121 disposed like the bearing 120 in the upper part of the support 110, to guide the latter.

The reduction gear 135 is arranged relative to the plates 114, 116 so that its vertical output shafts are strictly perpendicular to the horizontal output shaft of the motor 131.

The vertical output shaft 135a of the reduction gear therefore reciprocates through 90°.

In exactly the same way as described with reference to FIG. 4a, the second drive means 76 just described drive the transfer table with a hypocycloidal movement.

This is because the drive means 131, 135 reciprocate the vertical output shaft 135a through 90°.

This movement is transmitted to the first gear means 130, 132 and the second gear means 134 via intermediate gear means 140, 142, as described with reference to FIG. 4a, in order to drive rotation of the support 110 of the transfer table 32 about the vertical axis 135a.

As shown in FIGS. 5 to 7, the retaining means 150 associated with the transfer table 32 are in two parts 154 and 156 on respective opposite sides of an object support 16 fed by the transfer table 32.

The positioning means 154 define an extreme position of the support.

They include a piston-and-cylinder actuator 158 for moving an arm 160 (FIG. 5) and having at its free end an imprint 162 (FIG. 6) adapted to receive the support 16 in this extreme position.

This position can be adjusted very accurately by means of an abutment 164 which limits the stroke of the actuator 158.

The second positioning means 156 further include a piston-and-cylinder actuator 166 for moving an arm 168.

The second positioning means 156 adjust the position of the support 16 locked against said imprint 162 of the arm 160.

This ensures very accurate positioning of the object support 16.

When the support 16 is retained in the position shown in FIG. 5 by the retaining means 150, the transfer table that moves the support 16 into this position withdraws into a waiting position (position 32(A) in FIG. 3) to await a new support (see below).

It must be noted that FIG. 5 shows a buffer clamp 170 for constituting a stock of objects to be printed at a precise time in the offloading process.

In FIG. 7, the transfer table 32 has just been withdrawn and is in the waiting position previously referred to, i.e. in a position such that one of the locations 32a is below a new stack support filled with objects 28 to be printed, while the other location 32b is disposed under the empty stack support 16 from which the objects to be printed have just been offloaded.

It will be noted that in this position the new loaded object support rests on interior and exterior rails at least one of which has a buffer forming a stop at one end.

FIG. 7 shows only the exterior rail 171.

As explained later, in the description of the various movements of the transfer table, the table is moved vertically up by the first drive means 72 to raise the loaded object support and thereby disengage it from its stop.

The method of using the transfer table 32 of the transfer system 31 will now be described with reference to FIGS. 8 to 27.

The even-numbered FIGS. 8, 10, 12, 14, 16, 18, 20, 22, 24 and 26, show the transfer table 32 in various positions obtained by moving it horizontally or vertically.

The transfer table can occupy three positions following a vertical movement, namely a bottom position $P_b$, a middle position $P_m$, and a top position $P_h$.

These figures also show the position of the guide rail 58 from FIG. 2a.

The odd-numbered FIGS. 9, 11, 13, 15, 17, 19, 21, 23, 25 and 27 show in plan view the various successive positions of the transfer table 32, which can process two object supports 16A and 16B simultaneously.

The various elements operative during movement of the transfer table 32 and offloading of the objects to be printed are represented in a highly diagrammatic manner in the odd-numbered figures.

It will be noted that the operations that relate to the loading of the printed objects at the loading station 38 associated with the transfer system 35 and the corresponding transfer table 36 are symmetrical to those described with reference to FIGS. 8 to 27.

It will be noted that the support 16A is guided on the conveyor 30 by the guide rails 171 and 173 and its movement is driven by a belt 174 running around rollers 176, 178, 180, rotation of one of which is driven directly by a motor that is not shown.

FIGS. 8 and 9 show the transfer table 32 at the position $P_m$ during its operation.

In these figures, the object support 16B is filled with objects to be printed and the support 16B is empty and will therefore be evacuated toward the intermediate conveyor 42 (FIG. 2).

To this end, the second drive means 76 shown in FIGS. 4a to 4b are actuated so that the transfer table 32 effects a hypocycloidal movement and returns to the position indicated in FIGS. 10 and 11.

In this new position, the object support 16B is again face-to-face with the guide rails 56 and 58 but is nevertheless retained at the corresponding location of the transfer table 32 by the centering means previously referred to, and where applicable by the suction system.

The object support 16A is at the location that was occupied by the support 16B in FIGS. 8 and 9, i.e. ready to be offloaded of objects to be printed.

As shown in FIGS. 12 and 13, the first drive means 72 of the transfer system are actuated to position the transfer table 32 in its top position ($P_h$), which moves the object support 16B to the height of the arms 160 and 168 of the retaining means 150 (FIG. 5) so that it can be taken up by them.

In this position, there are virtually no objects to be printed in the buffer stock constituted by the clamp 170 and the latter is therefore opened when the last object is withdrawn, whereas the first and second retaining means 154 and 156 are actuated to grip the loaded object support 16B and hold it in position.

Then, another mechanism not described here raises the stack of objects 28 to be printed in order to offload them.

FIGS. 14 and 15 show the stack of objects 28 held in the top position by the mechanism previously mentioned, of which only an arm 190 is shown.

As indicated in FIG. 15, a new support 16C loaded with objects to be printed is ready and waiting on the guide rails 171 and 173.

With the object support 16B held in position by the retaining means 154 and 156 of FIG. 5, the first drive means 72 of FIG. 4a are actuated to lower the transfer table to its lowest position $P_b$.

This movement, on passing through the intermediate position $P_m$, leaves the empty object support 16A on the guide rails 56 and 58 so that it is evacuated on the intermediate conveyor 42 and driven by the belt 46.

Figure 18:
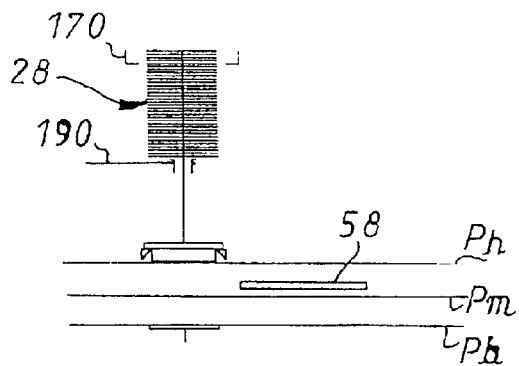
Figure 17:
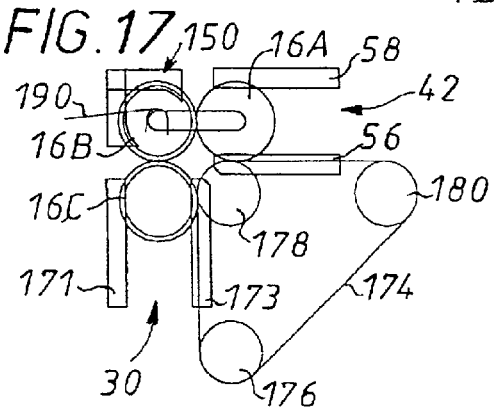
Figure 19:
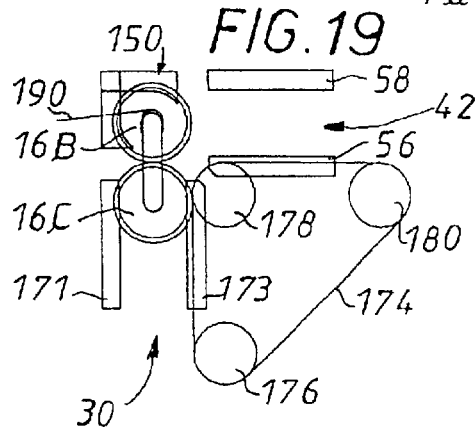
Figure 20:
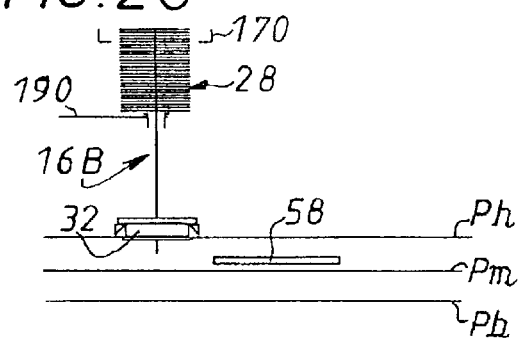

Once the transfer table is at the lowest level, the second drive means (76) are then activated to withdraw it with a hypocycloidal movement to the position shown in FIGS. 18 and 19.

This position corresponds to that shown in the FIG. 7 perspective view.

While the stacked objects 28 on the support 16B are still being unstacked, the first drive means 72 of FIG. 4a move the transfer table 32 from the bottom position $P_b$ to the top position $P_h$.

On passing through the intermediate position $P_m$, the transfer table 32 entrains the support 16C of objects to be printed, releasing it from its stop.

With the transfer table in the top position ($P_h$), the retaining means 154 and 156 of FIG. 5 can be actuated to remove from them object supports 16 being stacked, the support then resting on the corresponding location 32b of the transfer table.

Figure 22:
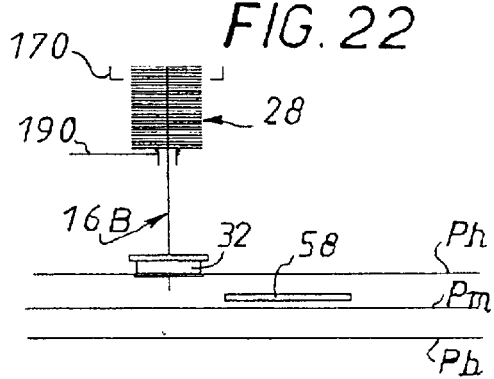
Figure 21:
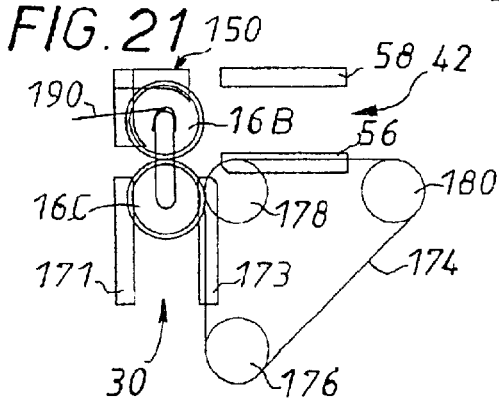
Figure 23:
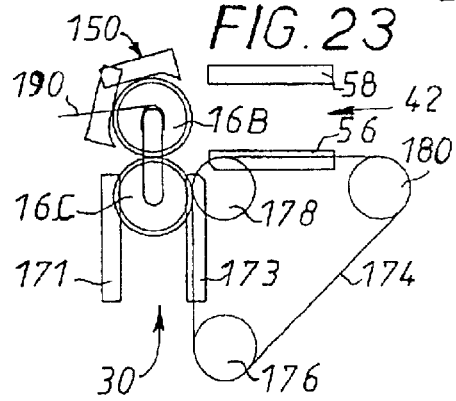

As shown in FIGS. 22 and 23, the retaining means 150 are deactivated.

The buffer clamp 170 is then closed, as shown in FIG. 24, to constitute a buffer stock consisting of the objects 28 to be printed not yet offloaded.

The arm 190 of the mechanism for raising the objects to be printed is then withdrawn and the transfer table 32 is then ready to be lowered again to the intermediate level $P_m$ by the first drive means 72, as shown in FIGS. 8 and 9.

The transfer system can process two object supports simultaneously, for example one support loaded with objects ready to be unstacked and an empty support that has just been unstacked to enable one to be replaced by the other.

Thanks to the retaining means 150, while the loaded support is in the process of being unstacked, a system of this kind evacuates the emptied support and takes up a position awaiting reception of a new support loaded with objects to be printed.

The reasoning is exactly the same for the operations that load an empty support with objects to be printed and evacuate a support loaded with stacked objects.

The transfer system can advantageously process object supports with a high throughput.

Also, this system is advantageous in that it can transfer the object supports two-by-two using a simple and compact mechanism.

It will be noted that the operations of transferring object supports and offloading or loading objects to be printed or that have been printed from or onto the supports are effected within a space of compact overall size.

Because of its simplicity, the transfer system is also of low cost.

Furthermore, the transfer system includes a small number of components, which advantageously facilitates assembly and adjustment and also reduces the amount and frequency of maintenance work.

It will further be noted that the drive mechanism of the transfer table described with reference to FIG. 4a and in particular the mechanism concerning the second drive means 76 for imparting a hypocycloidal movement to the transfer table is a high-precision mechanism without play.

It will be noted that the crank mechanism downstream of the motor 78 imparts a smooth motion without play to the whole of the mechanism.

Accordingly, the mechanism stops very accurately at the extreme position of the transfer table of the system.

What is claimed is:

1. A system for transferring supports for objects which can be stacked or unstacked between a conveyor and a machine for printing said objects, comprising:

a mobile transfer table that has a first location and a second location that are each adapted to receive an object support and to occupy a plurality of positions, first drive means adapted to drive the transfer table vertically up or down, and second drive means adapted to advance or withdraw the transfer table horizontally according to a hypocycloidal movement at an end of which the first location occupies an initial position of the second location and the second location occupies a different position than an initial position of the first location, the second drive means also being adapted to transfer simultaneously a support containing objects and an empty support or to withdraw the empty transfer table to a position awaiting a new support.

2. The system according to claim 1, further comprising retaining means for retaining an object support while stacking or unstacking objects in a position above the transfer table and the second drive means are activated to withdraw the transfer table to the waiting position.

3. The system according to claim 2, wherein the retaining means are in two parts and comprise first positioning means adapted to define an extreme position of the support and which include an imprint adapted to receive the support in that extreme position and second positioning means adapted to adjust the position of the support against said imprint.

4. The system according to claim 1, wherein the first drive means include a piston-and-cylinder actuator.

5. The system according to claim 1, further comprising means for centering the supports at each location of the transfer table.

6. The system according to claim 5, wherein the centering means take the form of a recess formed in the thickness of the transfer table at each location thereof.

7. A printing machine including circular contour printing table which has a plurality of object stations regularly distributed at its periphery and each adapted to receive an object to be printed, a station for off loading objects to be printed from a support, and a station for loading printed objects onto an empty support, wherein at least on loading and/or offloading station includes a transfer system according to claim 1.

8. The printing machine according to claim 7, comprising a first said transfer system and a second said transfer system, a conveyor for feeding supports containing objects to be printed to the first transfer system of an offloading station, means for conveying empty supports offloaded from the first transfer system of the offloading station to the second transfer system of the loading station to be loaded with printed object, and a second conveyor for evacuating the supports containing printed objects from the second transfer system.

9. A system for transferring supports for objects which can be stacked or unstacked between a conveyor and a machine for printing said objects, comprising:

a mobile transfer table that has two locations that are each adapted to receive an object support and to occupy a plurality of positions, first drive means for driving said transfer table vertically, and second drive means for moving said transfer table horizontally and transferring simultaneously a support containing objects and an empty support or withdrawing the empty transfer table to a position awaiting a new support, wherein the second drive means include a motor means with a horizontal shaft connected to a crank mechanism coupled to a pivot adapted to be rotated about a vertical axis by the motor means and first gear means and second gear means provided on the pivot and on a support member of the transfer table respectively, cooperate with each other so that the transfer table rotates about the pivot.

10. The system according to claim 9, further comprising intermediate gear means through which the first and second gear means cooperate with each other.

11. The system according to claim 9 wherein the crank mechanism has a first part mounted on the shaft of the motor means and which includes a lever inclined to said shaft and extending from said first part and a second part in the form of a crank pin mounted at one end on the free end of the lever to rotate freely thereon and perpendicularly thereto and said second part has an opposite end adapted to pivot on a horizontal pin perpendicular to the shaft of the motor means and which is held between two vertical walls of the pivot.

12. A system for transforming support for objects which can be stacked or unstacked between a conveyor and a machine for printing said objects, comprising:

a mobile transfer table that two locations that are each adapter to receive an object support and to occupy a plurality of positions, first drive means for driving said transfer table vertically, and second drive for moving said transfer table horizontally and transferring simultaneously a support containing objects and an empty support or withdrawing the empty transfer table to a position awaiting a new support, wherein the second drive means include a motor means that includes a motor with an output shaft connected to a reduction gear with an output shaft which is perpendicular to the output shaft of the motor, the motor being controlled so that its output shaft reciprocates, thereby reciprocating the output shaft of the reduction gear.

13. The system according to claim 12, wherein first gear means and second gear means on the output shaft of the reduction gear and on a support of the transfer table, respectively, cooperate with each other so that the transfer table rotates about the output shaft of the reduction gear.

14. The system according to claim 13, wherein the first and second gear means cooperate with each other through the intermediary of intermediate gear means.

15. The system according to claim 13, wherein the first drive means operate on the support member of the transfer table.

* * * * *